Oct. 9, 1928.
H. MARLES
1,686,704
WORM GEAR ADJUSTMENT FOR MOTOR VEHICLE STEERING GEARS
Filed Oct. 28, 1927    2 Sheets-Sheet 1
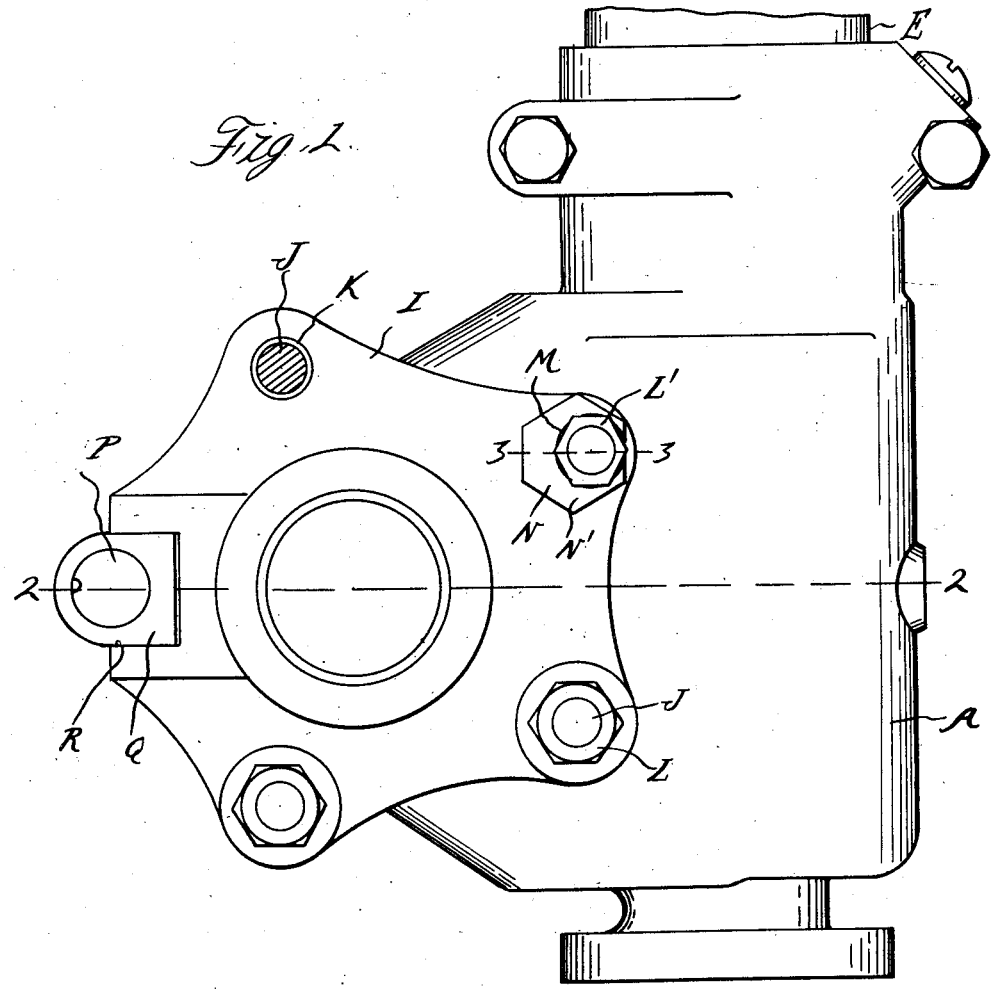
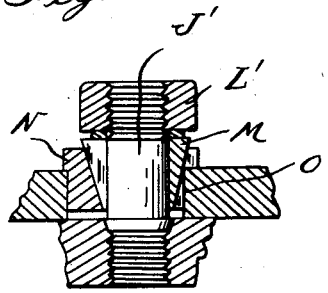
Inventor
Henry Marles
By Whittemore Hulbert
Whittemore & Belknap
Attorneys Oct. 9, 1928.　　　　　　　　　　　　　　　1,686,704
H. MARLES
WORM GEAR ADJUSTMENT FOR MOTOR VEHICLE STEERING GEARS
Filed Oct. 28, 1927　　　2 Sheets-Sheet 2
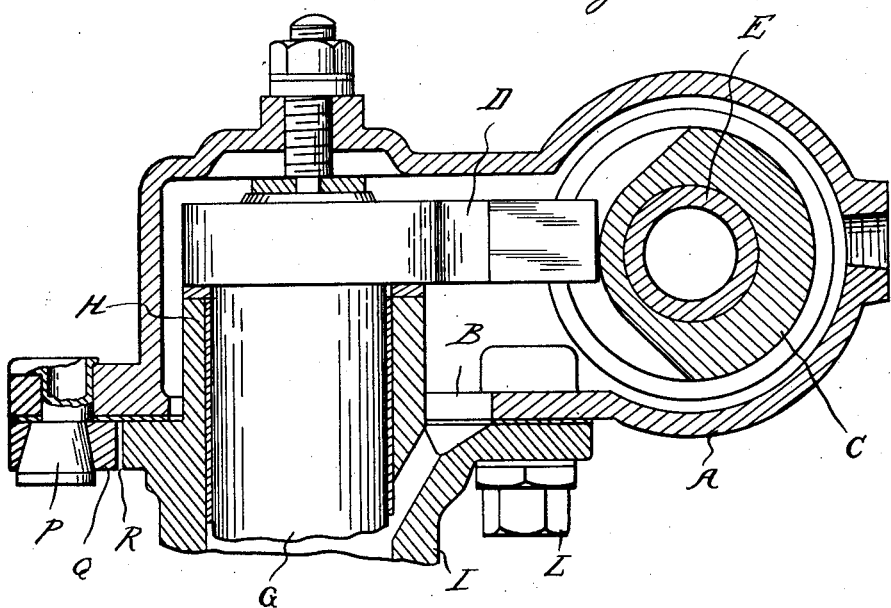
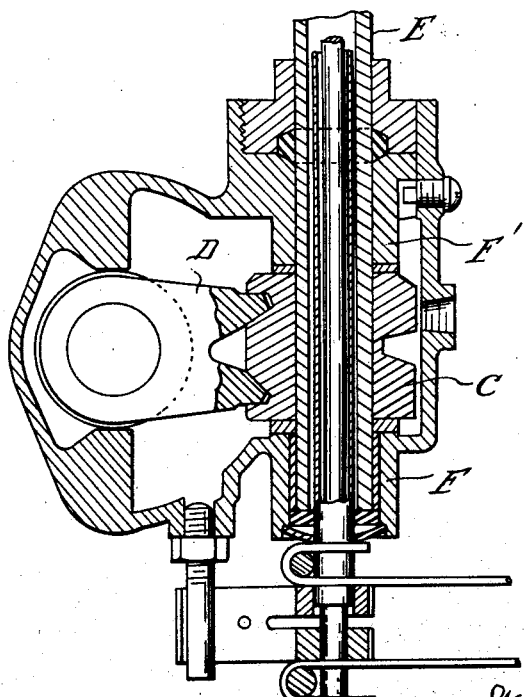
Inventor
Henry Marles Patented Oct. 9, 1928.

1,686,704

UNITED STATES PATENT OFFICE.

HENRY MARLES, OF DETROIT, MICHIGAN, ASSIGNOR TO GEMMER MANUFACTURING COMPANY, OF DETROIT, MICHIGAN, A CORPORATION OF MICHIGAN.

WORM-GEAR ADJUSTMENT FOR MOTOR-VEHICLE STEERING GEARS.

Application filed October 28, 1927. Serial No. 229,488.

The invention relates to motor vehicle steering gears of that type in which the rotation of the steering stem is transmitted to the mechanism for turning the wheels through the medium of worm gearing enclosed within a housing, the worm and the gear being journaled in bearings respectively on the housing and its cover. Heretofore constructions of the type have been made in which adjustment of the gear in relation to the worm can be effected through a movement of the cover upon the housing and more specifically by the use of an eccentric bushing upon one of the studs for holding the cover to the housing which bushing may be rotatably adjusted to effect a transverse movement of said cover. It has been found however that with such a construction the gear and worm are not held and accurately positioned as is desirable for the best operation of the mechanism. The reason for this is that while the eccentric bushing may fit its bearing in the cover with a minimum of clearance it is impossible to obtain the same accuracy in the fitting of the bushing upon the stud. Consequently when in operation the thrust of the worm upon the gear is alternately in reverse directions. There may be a slight displacement of the housing cover which carries the journal bearing for the gear. Again a slight lost motion between the bushing and the stud interferes with accurate adjustment of the gear into mesh with the worm.

To overcome these difficulties I have devised a construction of adjustment means which, after being once adjusted and clamped, will hold the bearings for the worm and gear in rigid relation so as to prevent any relative displacement. The invention therefore consists in the peculiar construction as hereinafter set forth.

In the drawings;

Figure 1 is an elevation of a housing for the worm gearing showing the adjustment means applied thereto.

Figure 2 is a cross section on line 2—2 of Figure 1.

Figure 3 is a section on line 3—3 of Figure 1.

Figure 4 is a longitudinal section on line 4—4 of Figure 1.

The housing for the gearing is formed with a body portion A having an entrance orifice B of sufficient size for the passage therein of the worm C and worm gear D. The worm C is mounted upon the steering stem E which is journaled in bearings F and F' in the body portion A and at opposite ends of said worm C. The worm gear D is mounted on a rock shaft G which is journaled in a bearing H upon a cap member I for closing the opening B. This cap I is secured to the body portion A by a series of studs J, mounted in said body and passing through enlarged apertures K in the cap, and L are clamping nuts engaging the threaded ends of said studs and serving to clamp the cover to the body A.

My improved adjustment means comprise a split conical bushing M sleeved upon one of the studs J' and a cooperating split eccentric bushing member N peripherally fitting the circular aperture O in the cover and having the eccentric conical recess for receiving the member M. The member N is provided with a polygonal head N' which serves as a wrench hold for the rotative adjustment of the member N about the stud J'. The arrangement is such that the cover I and bearing H, rock shaft G and worm gear D carried thereby may all be bodily adjusted in relation to the housing A and worm E by a rotation of the member N. This, being eccentric, will move the cover and consequently the gear D toward or from the worm E until the proper adjustment is secured. The clamping nut L' is then screwed down upon the stud J' so as to press against the split conical sleeve M forcing it into the conical recess in the member N. This will not only tighten the split member N in the recess O but will also contract the bushing M so as to tightly fit the stud J' thereby preventing any lost motion. It will be understood that this adjustment on the cover I is permitted by reason of the enlarged apertures through which the studs J pass and provides abundant clearance for such adjustment.

In addition to the adjustment of the cover I by the means just described it is necessary to provide for a transverse adjustment. This is preferably accomplished by a second eccentric member P which is rotatably adjustably secured to the housing A and engages a bearing block Q located in the recess R in the cover I. Thus if it is necessary to adjust the worm wheel in the direction transverse to the adjustment by the member N, such adjustment may be effected by the rotation of the member P. This, through eccentric engagement with the block Q will shift said block in relation to the member A and will carry the cover I with it. However, this adjustment is necessary only in the original assembly of the gear and after once set, need not be disturbed. On the other hand the adjustment by the member N must be made from time to time to compensate for wear in the worm and worm gear and to take up lost motion.

The advantage of my improved construction of adjustment means is that by eliminating all lost motion the gears when once set, will not become displaced and therefore it is only necessary to readjust to compensate for wear.

What I claim as my invention is:

1. In a steering gear the combination with a steering stem, a rock shaft to be actuated thereby, intermeshing gears respectively mounted on said stem and shaft, of a housing for said gears formed in a plurality of sections respectively providing journal bearings for said shaft and stem, and studs projecting from one of said housing sections through enlarged apertures in the cooperating section, nuts on said studs for clamping said sections together and adjusting means upon one of said studs comprising a split conical bushing sleeved on the stud and a split eccentric bushing having a conical recess for receiving said conical bushing and peripherally engaging a circular aperture in the cooperating housing member whereby the tightening of the nut upon the stud will simultaneously contract the inner member on the stud and expand the outer member to produce a perfect fit.

2. In a steering gear, adjustment means for shifting the worm wheel bearing member in relation to the worm bearing member comprising a stud projecting from the one through an aperture in the other, a split conical bushing sleeved on said stud, a second bushing sleeved on the stud provided with a conical recess for receiving said conical bushing and an eccentric peripheral portion for fitting the apertured member, a polygonal head on said eccentric bushing for facilitating rotative adjustment of the same on said stud and a clamping nut engaging said stud and bearing on said conical member to effect the contraction of the latter about the stud and the expansion of the eccentric bushing member to take up all lost motion.

In testimony whereof I affix my signature.

HENRY MARLES.